US011354395B2

(12) United States Patent
Manning et al.

(10) Patent No.: US 11,354,395 B2
(45) Date of Patent: Jun. 7, 2022

(54) AUTHENTICATION METHOD FOR A COMPUTING DEVICE USING INTERACTIVE GAME BOARD AND GAME PIECE IMAGES (71) Applicants: Philip Manning, Shaker Heights, OH (US); Conor McLennan, Cleveland Heights, OH (US); Ye Zhu, Westlake, OH (US)

(72) Inventors: Philip Manning, Shaker Heights, OH (US); Conor McLennan, Cleveland Heights, OH (US); Ye Zhu, Westlake, OH (US)

(73) Assignee: CLEVELAND STATE UNIVERSITY, Cleveland, OH (US)

(*) Notice: Subject to any disclaimer, the term of this patent is extended or adjusted under 35 U.S.C. 154(b) by 588 days.

(21) Appl. No.: 15/943,910

(22) Filed: Apr. 3, 2018

(65) Prior Publication Data

US 2018/0285551 A1 Oct. 4, 2018

Related U.S. Application Data (60) Provisional application No. 62/480,786, filed on Apr. 3, 2017.

(51) Int. Cl.
| G06F 21/36 | (2013.01) |
| G06F 21/45 | (2013.01) |
| H04L 9/32 | (2006.01) |
| G06F 3/04883 | (2022.01) |
| A63F 3/00 | (2006.01) |

(Continued)

(52) U.S. Cl.
CPC .......... *G06F 21/36* (2013.01); *A63F 3/00173* (2013.01); *A63F 3/00643* (2013.01); *G06F 3/04883* (2013.01); *G06F 21/45* (2013.01); *G09C 5/00* (2013.01); *H04L 9/3226* (2013.01); *H04L 9/3271* (2013.01); *A63F 1/00* (2013.01); *A63F 3/02* (2013.01); *A63F 5/00* (2013.01);

(Continued)

(58) Field of Classification Search
CPC ......... G06F 21/36; G06F 21/45; H04L 9/3226
See application file for complete search history.

(56) References Cited

U.S. PATENT DOCUMENTS 8,156,324 B1* 4/2012 Shnowske ........... H04L 12/1822
713/151
8,756,672 B1* 6/2014 Allen ...................... G06F 21/36
726/19

(Continued)

*Primary Examiner* — Viral S Lakhia
(74) *Attorney, Agent, or Firm* — Renner, Kenner, Greive, Bobak, Taylor & Weber Co., L.P.A.

(57) ABSTRACT

An authentication method and system includes a computing device, such as a smart phone, which includes a display for presenting a graphical and interactive game board that is used for entering a user's passcode. During the authentication process, the user selects a game board (e.g. chess, checkers, poker, backgammon, etc.) and associated game pieces for presentation on the display. The user then moves one or more game pieces to locations on the game board. Together, the selected game board, selected game pieces, and the movements and/or locations which the game pieces are moved on the game board form an entered passcode. This generated passcode is then compared with a stored passcode to authenticate the user before granting access to the computing device.

13 Claims, 6 Drawing Sheets (51) Int. Cl.
*G09C 5/00* (2006.01)
*A63F 3/02* (2006.01)
*A63F 1/00* (2006.01)
*A63F 5/00* (2006.01)

(52) U.S. Cl.
CPC ............... *A63F 2250/58* (2013.01); *G06F 2221/2133* (2013.01)

(56) References Cited

U.S. PATENT DOCUMENTS

| | | | |
|---|---|---|---|
| 9,286,765 B2* | 3/2016 | Saunders | G07F 17/3227 |
| 9,498,711 B2* | 11/2016 | Assa | A63F 13/12 |
| 9,524,619 B2* | 12/2016 | Colvin | G07F 17/3241 |
| 10,102,366 B2* | 10/2018 | Finnan | G06Q 20/4014 |
| 10,482,462 B1* | 11/2019 | Eidam | G06F 3/0482 |
| 2011/0053685 A1* | 3/2011 | Kim | G06F 21/36 463/30 |
| 2011/0264246 A1* | 10/2011 | Pantoja | G06Q 30/02 700/92 |
| 2014/0096196 A1* | 4/2014 | O'Connor | G06F 21/36 726/17 |
| 2014/0189856 A1* | 7/2014 | Yoo | G06F 21/36 726/19 |
| 2015/0017611 A1* | 1/2015 | Moumneh | G06V 40/166 434/107 |
| 2015/0205942 A1* | 7/2015 | Yang | H04L 63/083 726/19 |
| 2015/0249658 A1* | 9/2015 | Lee | H04L 9/0863 726/6 |
| 2016/0026786 A1* | 1/2016 | Thomas | G06F 21/31 726/27 |
| 2016/0214005 A1* | 7/2016 | McClure | A63F 13/44 |
| 2016/0371476 A1* | 12/2016 | Turgeman | G06F 21/31 |
| 2017/0346817 A1* | 11/2017 | Gordon | G02B 27/0172 |

* cited by examiner

AUTHENTICATION METHOD FOR A COMPUTING DEVICE USING INTERACTIVE GAME BOARD AND GAME PIECE IMAGES

CROSS-REFERENCE TO RELATED APPLICATION

This application claims the benefit of U.S. Provisional Application No. 62/480,786 filed Apr. 3, 2017, the contents of which are incorporated herein by reference.

TECHNICAL FIELD

Generally, the embodiments disclosed herein relate to authentication methods. Particularly, the embodiments disclosed herein relate to authentication methods using interactive images. More particularly, the embodiments disclosed herein relate to authentication methods using an interactive game board and game pieces presented.

BACKGROUND

Along with the advancements of electronic communication networks, such as the Internet, and computing devices, such as laptop computers and mobile handheld devices, electronic transactions have increasingly become the dominant form of information exchange. Access to protected information on a computing device has traditionally been accomplished through the use of alphanumeric passcode authentication. For example, a user may input a four-digit numeric passcode to gain access to the computing device. Thus, while the use of short strings of alphanumeric characters may be simple for allowing the user access to the device, there are significant unwanted drawbacks to their use.

One disadvantage to using alphanumeric passcodes is the lack of mathematical robustness. For example, a four digit numerical passcode provides only 10,000 possible permutations (10×10×10×10). And therefore, the limited number of permutations makes it easier for an unauthorized user to gain access to the device.

Another disadvantage is the difficulty users have remembering such alphanumeric passcodes. For example, most individuals have to use several passcodes to access various devices, applications, in their daily lives, which are composed of alphanumeric strings, which blur together. Psychologists have long known that people frequently have trouble accurately retrieving information from their long-term memories because other similar memories cause confusion, and therefore lead to mistakes. Psychologists have referred to this phenomena as "interference", lack of distinctiveness and "Neighborhood Density Effect". The net result of this phenomena is competition, as users run the risk of mixing up pieces of information because they resemble existing pieces of information that they already have stored in their long-term memory.

In view of these problems, experts in computer security have grown frustrated by the lack of progress in developing improvements to such alphanumeric passcodes. Many experts agree that passcode protection systems have not met, and will never meet, the twin goals of mathematical robustness and ease of use, including memorability. That is, current passcodes are viewed as requiring a necessary tradeoff, whereby the passcode is either easy to remember or has a high degree of security, but not both. Meeting these twin goals of a highly secure and memorable passcode has been referred to as the 'silver bullet' in computer security but has yet to be developed.

In addition, there is a need for interactive game-based authentication systems and methods for use with a wide range of computing devices, whereby one or more game board images are displayed so that a use can move the game piece to predetermined locations on the game board in order to enter their passcode and gain access to the stored data, applications or other content on the computing device. Therefore, there is a need for authentication methods of the various embodiments allows for a high level of security, while also being easy to remember, by using different games for different devices and/or by changing games over time, so that users are able to avoid having other passcodes they have stored in their memory interfere with their retrieval of the desired passcode.

SUMMARY

Accordingly, various embodiments disclosed herein have been made in view of the above problems, providing various systems and methods of authenticating a user using a graphical and interactive game board passcode. In an exemplary embodiment, a user is presented with a plurality of graphical game board images, such as chess, checkers, Chinese checkers, etc. on a computing device such as a laptop or handheld smartphone. The user must select the correct game that the user had previously selected and stored on the computing device as a first round of authentication. If successful, the user is then presented with a display of the correctly selected game board, whereupon the user is required to sequentially select predetermined game pieces, such as a white pawn and a black king in the game of chess for example, and move the game pieces to predetermined locations on the game board. The method of selection can be either through touch screen or other device, such as a mouse. This generates a passcode based on the combination of the particular game, the predetermined game pieces, and the predetermined locations on the game board. The generated passcode is compared with a stored passcode to authenticate the user in order to grant access to the device.

In addition, or in the alternative, the computing device has the capacity to play the selected game against the user. For example, the computing device might place a game piece in the wrong location and the user will have to relocate the game piece icon to its correct location.

Additionally or in the alternative, the computing device will authenticate a user through the user's gaming history and gaming behavior. For example, if the user typically uses white pawns in the game of chess, the computing device will be able to authenticate the user by future uses of white pawns. Conversely, if white pawns are not used, the computing device will deny access based on stored data that the user has always used white pawns for the user's previous passcodes.

Further, the computing device includes game changing attributes such that the passcode is multidimensional. After a set period of time, the computing device may change the current game being used with another game. This game changing component of the authentication method is beneficial because it allows for what psychologists refer to as a release from "interference", such that previous passcodes (or present passcodes for use with other devices) no longer interfere during memory retrieval because the user has created a new (unique) passcode space in their memory.

In addition, or in the alternative, various embodiments disclosed herein are directed to an apparatus for authenticating a user. The apparatus may comprise a display device, whereby a plurality of game piece images are arranged in a pattern. The apparatus may further comprise a processor. The processor may execute program instructions for receiving a sequence of selected inputs. Each input may correspond to one of the plurality of graphical game piece images and the plurality of graphical game piece images may be repositioned to designated locations on the game board after receiving each input. The processor may further determine whether the user is authenticated based on the received sequence of inputs.

In light of the foregoing, it is a first aspect of the various embodiments disclosed herein to provide an authentication method comprising presenting a menu of a plurality of game boards; selecting one of the game boards as a first passcode component; displaying the one the game board and at least one icon relative to the game board; selecting the at least one icon as a second passcode component; placing the at least one icon selected at a predetermined location on the game board as a third passcode component; generating an entered passcode from one or more of the first, second and third passcode components; determining whether the entered passcode is authenticated based on a comparison with a previously set rule.

It is a further aspect to provide an authentication method comprising displaying a game board and at least one user-controlled icon relative to the game board and at least one computer-controlled icon relative to the game board; initiating a game between the user-controlled icon and the computer-controlled icon; moving the user-controlled icon in response to a position of the computer-controlled icon on the game board to generate an entered passcode; determining whether the entered passcode is authenticated based on a comparison with a previously set rule.

BRIEF DESCRIPTION OF THE DRAWINGS

These and other features and advantages of the present invention will become better understood with regard to the following description, appended claims, and accompanying drawings wherein:

DETAILED DESCRIPTION

Systems and methods for authenticating a user of a computing device using a graphical (i.e. virtual), interactive game board passcode is presented in the various embodiments disclosed herein. Such systems and methods increase the ease in which a user is able to remember a passcode, particularly when the user has multiple devices, while providing increased mathematical robustness and security relative to existing authentication systems and methods. Furthermore, the various systems and methods disclosed herein also makes the process of user authentication an enjoyable process for users. As used herein, the terms "computing device", "computer device", "device", "processor" or "computer" includes, but is not limited to, any programmed or programmable electronic device or coordinated devices that can store, retrieve, and/or process data, and may be optionally configured as a processing unit or in a distributed processing configuration. For example, such computing device may include a smart phone, or personal computer for example The various embodiments for authenticating a user that are disclosed herein utilize games and/or game changing behavior. Thus, these embodiments shift away from a conventional alphanumeric based password systems, and is qualitatively distinct from existing image based authentication methods.

In the embodiments disclosed herein, a passcode is configured, not as a numerical string, an alphabetical string, or a combination of numerical and alphabetical characters, but as a permutation or combination of one or more of the following: 1.) the selection of a correct game (i.e. passcode component); 2.) the selection of the correct image-based icons (or game pieces) having identities associated with a particular game (i.e. passcode component), and 3.) placing the icons (or game pieces) at the appropriate locations on the game board (i.e. passcode component).

Figure 3:
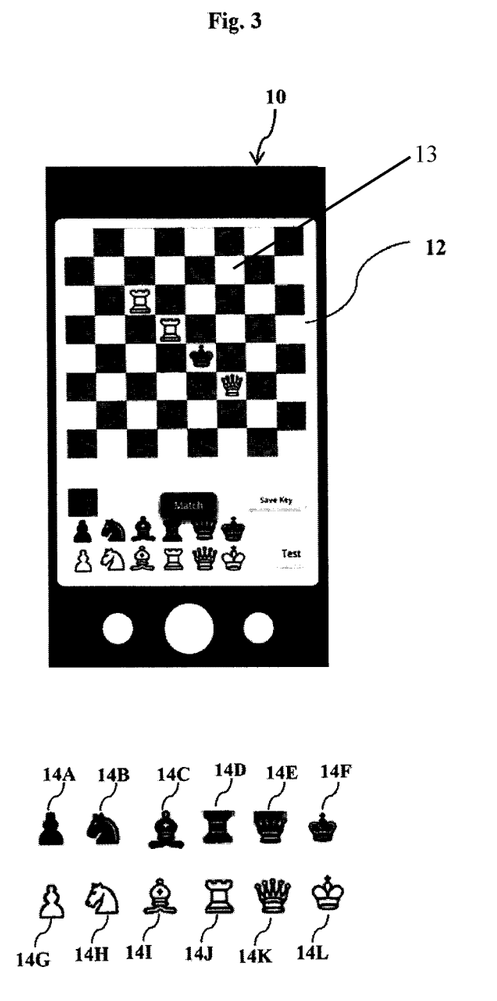
FIG. 3 is a plan view of the display screen of the handheld device presenting another game in accordance with one or more embodiments disclosed herein.

That is, a user memorizes the passcode described herein, not as a numerical series or string, such as "1, 2, 3, and 4", but as a permutation of images associated with a particular game, such as white pawns and black kings in the game of chess along with the spatial relationship between and among the game piece images on the game board. To understand this approach, it is helpful to contrast it with existing passcode security techniques. For example, on an Apple® iPhone®, the user enters four numerical digits as an authentication code, producing a maximum limit of ten thousand (10,000) possible passcode permutations. By contrast, the number of permutations in the simplest version of the exemplary embodiment, as depicted in FIG. 3, generates approximately three hundred and sixteen billion possible passcodes, which does not factor in the user having to select the correct game (step one in the permutation).

In the various embodiments disclosed herein, a variety of electronic computing devices having an input and output means, such as a computer, a mobile communication device, an ATM, or the like may be used as a terminal. While the various embodiments of the authentication method and system will be described in detail below, it should be understood that such embodiments are not limiting. In addition, although the exemplary embodiments are described as embodying several different features, one skilled in the art will appreciate that any one of these features could be implemented without the others.

Figure 1:
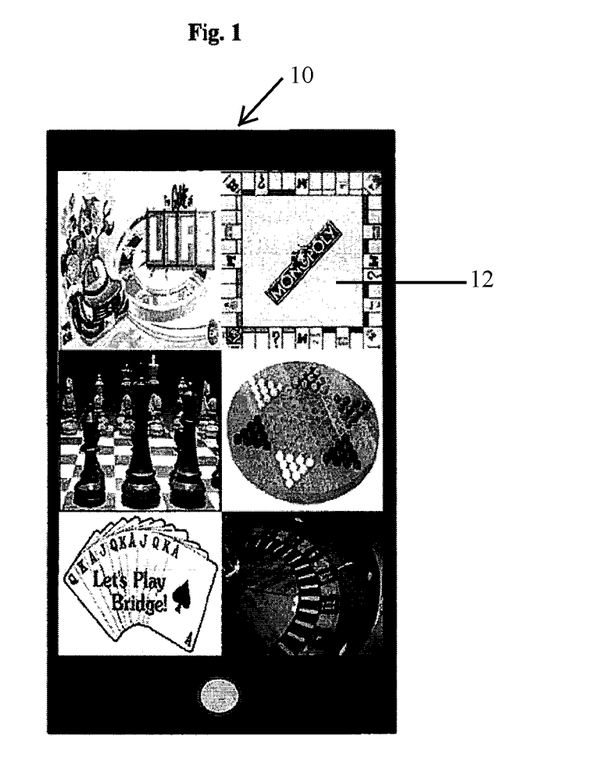
FIG. 1 is a plan view of a display screen of a handheld device utilizing an interactive game board authentication method in accordance with one or more embodiments disclosed herein.

FIG. 1 shows a display screen of a handheld computing device 10. The computing device 10 displays on a display screen 12, a set of games for authentication, such as chess, Chinese chess, card games, roulette, etc. The authentication procedure is started or initiated by the user inputting or selecting an appropriate game. If the user does not select the correct game, access to the device is denied. If the correct game is selected, the user moves on to the next level of authentication based on the game selected.

Figure 2:
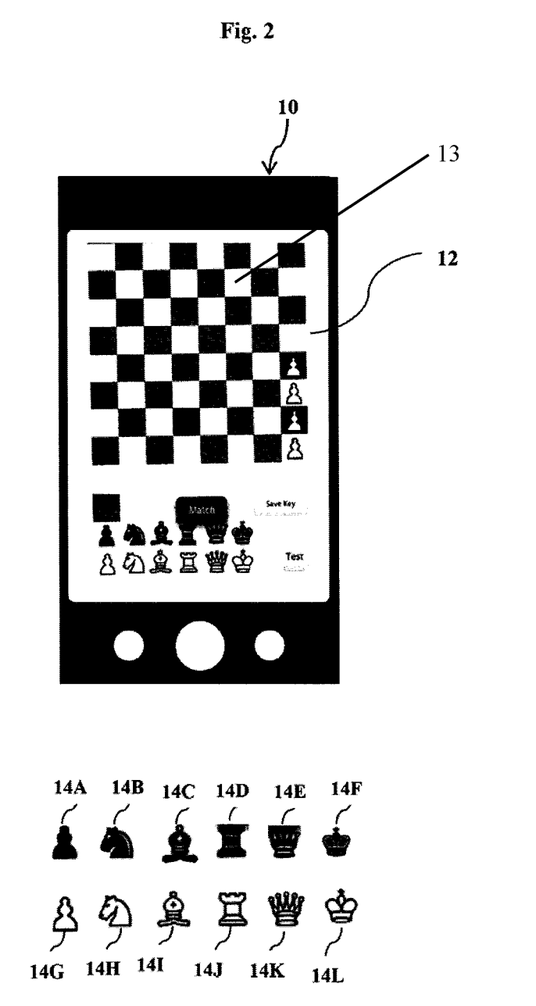
FIG. 2 is a plan view of the display screen of the handheld device presenting a game in accordance with one or more embodiments disclosed herein.

FIG. 2 shows the display screen 12 of the handheld computing device where the selected game 13 is a chess board, and icons or game pieces 14A-L are displayed. The display screen 12 may comprise a touch sensitive screen, or "touch screen," that is operable to detect a user's bodily contact with the screen to allow a user to interact with the device, such as by using a fingertip to select images presented on screen 12. In one embodiment, device 10 is a handheld smart phone device, such as an Apple® iPhone®, or other similar smart device as is known in the art.

FIG. 3 shows the manner in which a user has identified a different passcode from that shown in FIG. 2.

Figure 4:
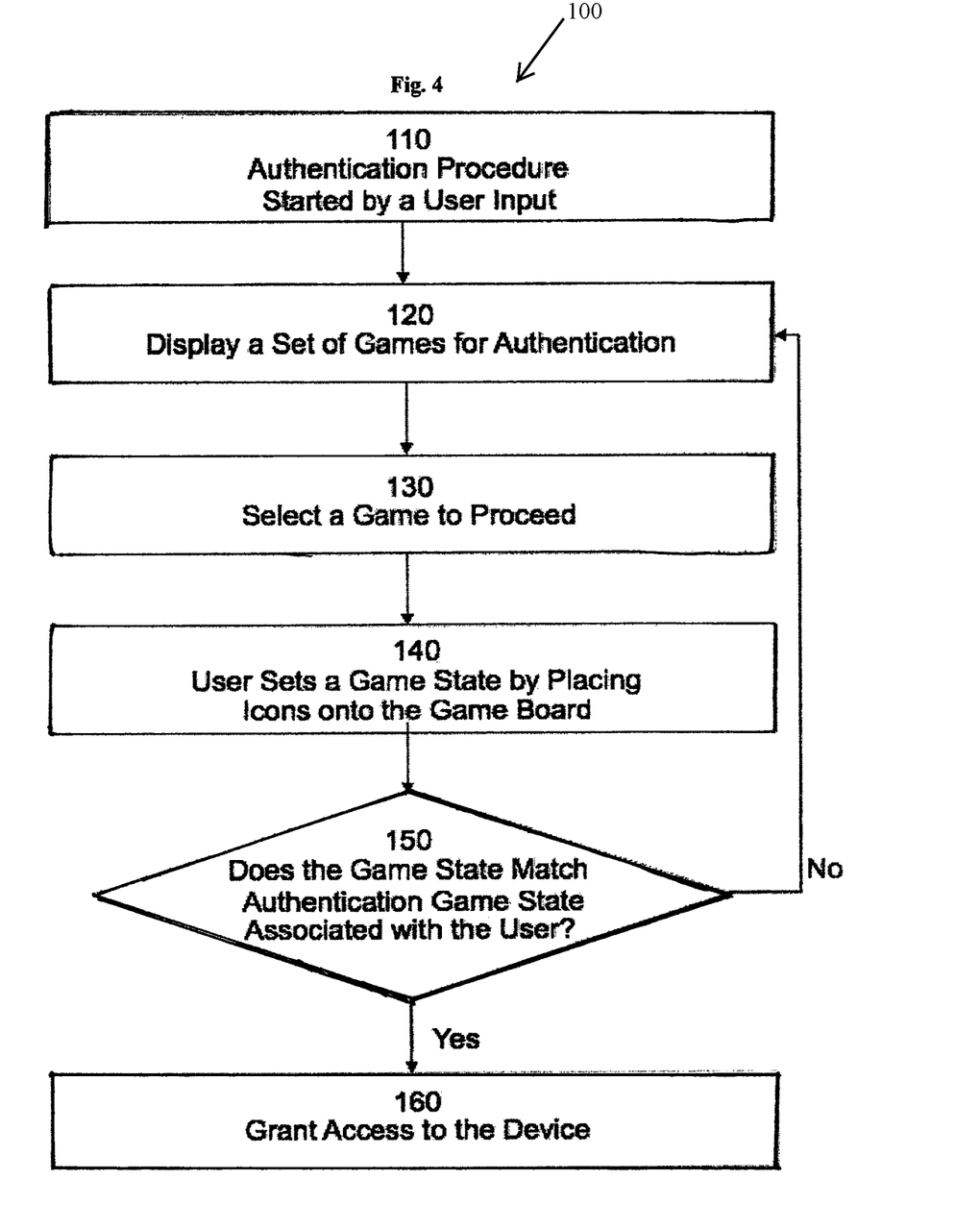
FIG. 4 is a flowchart of an interactive game board authentication method in accordance with one or more embodiments disclosed herein.

FIG. 4 presents a sequence for steps 100 of processing a computer program that embodies the authentication methods. The authentication procedure is initiated by user input at step 110. The input can be a user's touch on touchable devices, such as touch screens of smartphones/tablets, keystrokes, voice commands, or a press of a button. Upon initiation by the user, the device 10 displays a set of games that can be used for authentication at step 120. As shown in FIG. 1, the games 12 presented for use by the authentication methods can be any one of a variety of games, such as chess, Chinese checkers, roulette, card games, etc. Next, the user selects a game, which prompts the computing device 10 to display the empty game board at step 130 on the terminal or display screen 12. The user enters a game state as a passcode by placing one or more game pieces, tokens, or icons 14 onto the game board 13 at step 140 at one of more locations. At step 150, the device 10 attempts to match the entered passcode (i.e. passcode or rule) entered by the user in step 140 with a previously "set" authentication passcode that was recorded or stored when the computing device 10 initially enrolls users. If there is a match, the user is authenticated, and the user is granted access to one or more previously restricted areas the computing device 10 at step 160. The user is now permitted to use the computing device 10 as an authenticated user, to view, edit or change stored data on the computing device, or enter a room or building whose access is controlled by the computing device 10. If there is no match, the process 100 returns to step 120. In addition to returning to step 120, the computing device 10 may record authentication failures, and may prompt the user to set up an authentication game state with another, different game. Thus, one or more of the steps 130 and 140 as passcode components, which are used as an entered passcode at step 150.

Figure 5:
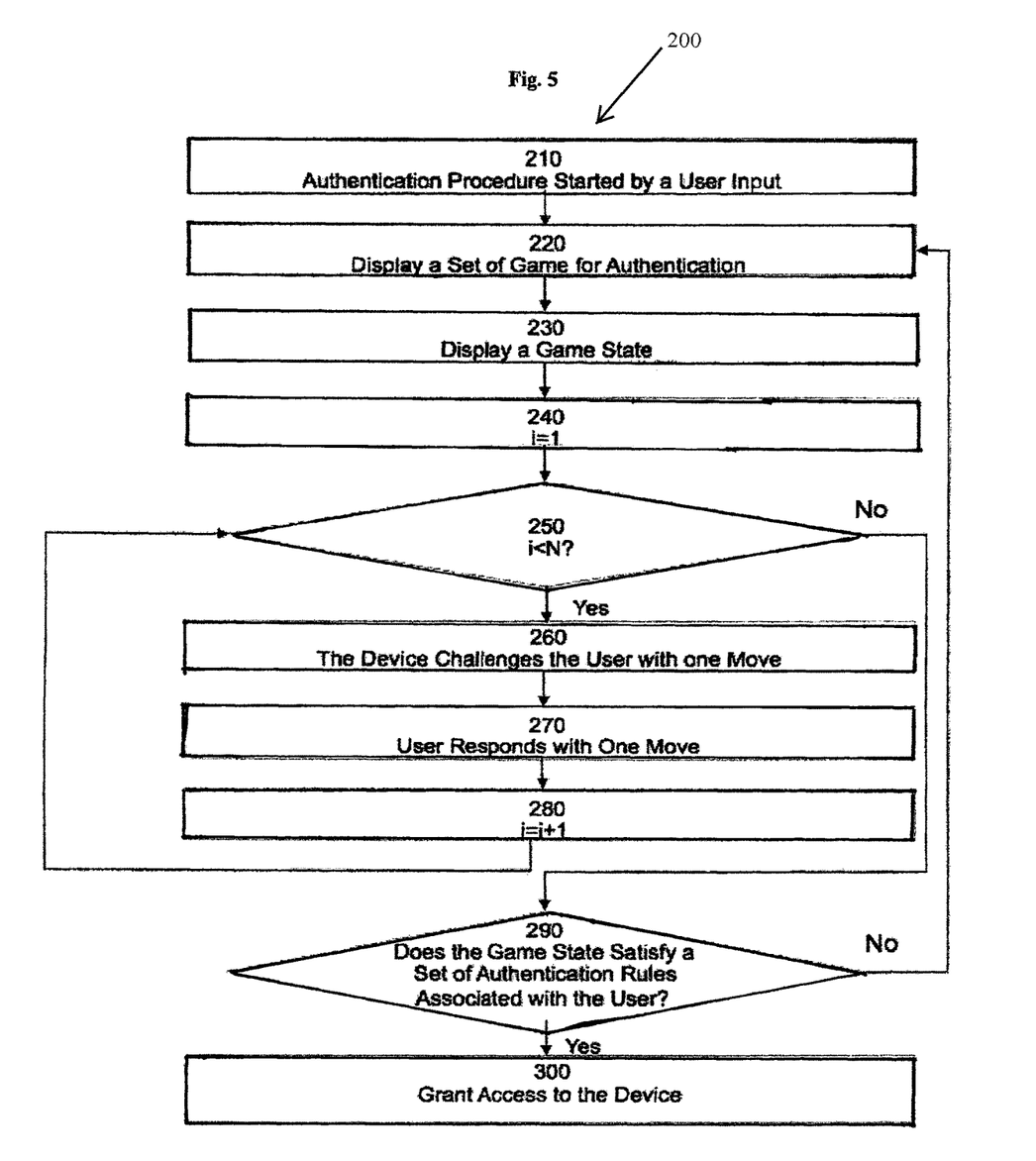
FIG. 5 is a flowchart of another interactive game board authentication method in accordance with one or more embodiments disclosed herein.

In addition, or in the alternative, FIG. 5 is a flow chart that shows another process 200 used to authenticate a user (i.e. user-controlled icon) of the computing device 10, whereby the user is required to play a game against the computing device 10 (i.e. computer-controlled icon) in order to authenticate themselves. For example, the computing device 10 challenges the user by a move on the game board and the user responds by making a move. The user's response can be a move of a game piece image on the game board or a removal and/or addition of a game piece image. For example, after the user has placed three white queens and a black king on certain squares of a chess board, the computer will play a move of its own. If the computer captures one of the user's pieces, the user must then authenticate themselves by a predetermined, correct response. This added level of security may be played out in real-time or any time basis, such as on the order of seconds and adds a layer of mathematical security to the authentication process. This added layer of security may also be triggered by users who fail to produce the correct iconic passcode by their placement of the game pieces, but are nevertheless close.

The authentication procedure discussed with respect to FIG. 5 is initiated by user input on the computing device 10 at step 210. The input can be a user's touch on a touchable device, such as touch screen of smartphones/tablets, as well as keystrokes, voice commands, or a press of a button. At step 220, the computing device 10 displays a set of a plurality of games 13 that can be used for authentication. The game used for authentication can be any one of a variety of popular games such as chess, Chinese checkers, various card games, Monopoly™, etc. Next, the user selects a game and the device 10 shows a game state at step 230. At step 240, the counter i is initialized to 1. At step 250, if the counter i is less than N, where N is the number of moves required for authentication, the authentication process 200 proceeds to step 260. If not, the process 200 proceeds to step 290. The number N can be changed from 1 to any desired integer number according to security requirements and usability requirements. For devices, applications, and services requiring less security and quick access, N can be equal to 1 for example.

Continuing, at step 260, the computing device challenges the user with a move. The move can be a legal move according to the game, a removal of a game piece, an addition of a game piece, or even an illegal move of a game piece. Consequently, knowledge of the games used for the passcodes is completely unnecessary. Next, the user responds with a move 270, which can be a legal move according to the game, a removal of a game piece, the addition of a game piece, or even an illegal move of a game piece. At step 280, the computing device increases the counter i by 1. At step 290, the computing device 10 checks whether the game state satisfies a set of authentication rules set by the user when the computing device 10 is enrolled by the user. If the game state satisfies the set of authentication rules, then the authentication process proceeds to step 300. If not, the process returns to step 220. In addition to returning to step 220, the computing device records authentication failures, and prompts the user to set up an authentication game state with another game. The authentication rules can be game-dependent. For example, if the chess game is used for authentication, one of the rules can be on the number of game pieces attacking the white king. The authentication rules can also be game-independent. For example, one rule can be the number of game pieces on the board. At step 300, the computing device grants access to the user, and the user is allowed to use the device 10 as an authenticated user, so as to view or change data stored on the device, or enter a room/building whose access is controlled by the device.

It should be appreciated that a "game" state forming an entered passcode for the various embodiments disclosed herein may include the position of one or more game pieces (i.e. icons) and/or the sequence of moves used to place game pieces (i.e. icons) at positions on the game board.

Figure 6:
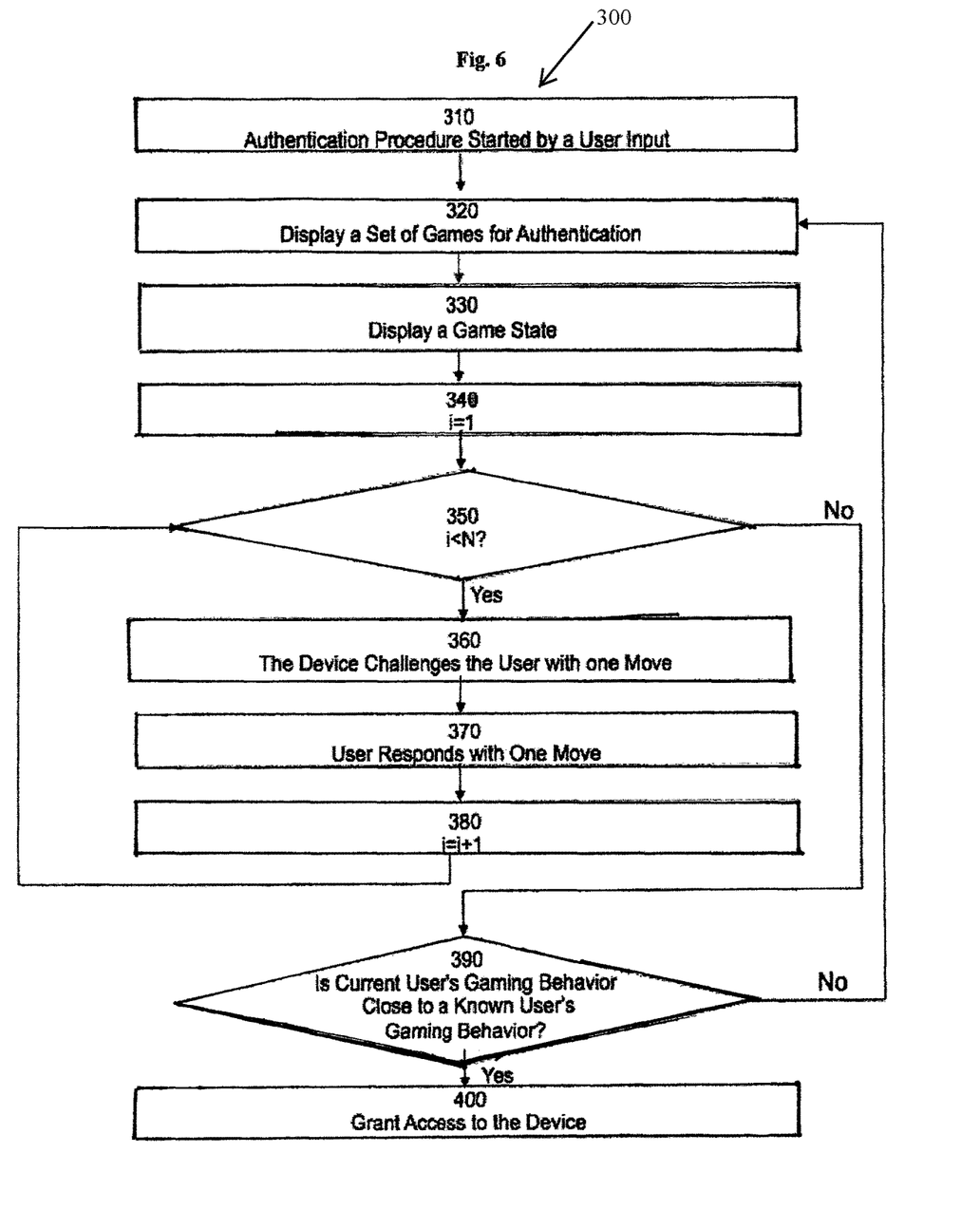
FIG. 6 is a flowchart of still another interactive game board authentication method in accordance with one or more embodiments disclosed herein.

FIG. 6 shows a process 300 used to authenticate a user of a computing device based on information the computer has about the user's previous gaming pattern or behavior. Thus, the computing device 10 is able to authenticate a playing style rather than simply a graphical code. The playing varies from one move to a whole game depending upon the security requirements. Initially, the computing device 10 receives an input from a user for authentication at step 310. The input can be a user's touch on touchable devices, such as touch screens of smartphones/tablets, keystrokes, voice commands, or a press of a button so as to control the game pieces (i.e. icons). The computing device 10 shows a set of games that can be used for authentication at step 320. The game used for authentication can be any of a variety of games, such as chess, Chinese chess, and Monopoly™ for example. Next, at step 330 the user selects a game and the computing device shows a game state. At step 340, the counter i is initialized to 1. At step 350, if the counter i is less than N, where N is the number of moves required for authentication, the authentication process proceeds to step 360. If not, the process proceeds to step 390. The number N may be changed from 1 to any integer numbers according to security requirements and usability requirements. For computing devices, applications, and services requiring less security and quick access, N can be equal to 1. The computing device 10 challenges the user with a move of a computer-controlled icon/game piece at step 360. The move can be a legal move according to the game, a removal of a game piece, adding a game piece, or even an illegal move of a game piece. The user responds with a move of a user-controlled icon/game piece at step 370. The user's move can be a legal move according to the game, a removal of a game piece, adding a game piece, or even an illegal move of a game piece. At step 380, the computing device increases the counter i by 1. Next, at step 390, the computing device checks whether a passcode based on the current user's gaming behavior (i.e. hos or her movements fo icons/game pieces) is sufficiently close to or matches the gaming behavior of a known user (i.e. previously stored passcode). If yes, then the authentication process proceeds to step 400 whereupon the user is permitted to use the computing device 10 as an authenticated user, so as to view or change data stored on the computing device, or enter a room/building whose access is controlled by the computing device 10. If not, the process proceeds to step 320. In addition to proceeding to step 320, the computing device 10 records authentication failures and prompt the user to setup an authentication game state with another game.

The authentication rules can be game-dependent. For example, if the chess game is used for authentication, one of the rules can be on the number of game pieces attacking the white king. The authentication rules can also be game-independent. For example, one rule can be the number of game pieces on the board. The computing device either grants or denies access by the user 400.

In the alternative, the selection of multiple games, game boards, and game board images can be combined to generate a multi-dimensional passcode. Thus, when first buying a smart phone or other computing device, the user will have the choice of selecting checkers, chess, backgammon, poker, or any other games from a large number of game templates. For example, if a user switches between a graphical chess piece to one of a roulette marker, a new area of vacant memory space will open.

As will be apparent to those skilled in the art, variations on the number of game piece/icon images included in the passcode and variations in the inclusion of game changing functions and time components are contemplated. For example, a generated passcode may require the selection of multiple graphical board game images, with game changing and time components between each image selection, or may require only the selection and movement of game piece images to pre-selected locations or spaces on the game board, or may require any combination of the various input components.

In addition to, or in the alternative, the computing device 10 may require a user to input a user name/ID first. If the user name/ID is required, the authentication will be based on the specific user's authentication data recorded when the computing device 10 is enrolling the user. The user name/ID can be skipped to allow quick access to the computing device 10. If the user name/ID is not required, the authentication will based on the authentication data of all known users of the computing device.

Finally, in addition to, or in the alternative, the system may provide on-screen hints to the user in order to capitalize on what is known from the memory literature to be effective mnemonic devices. For example, the user may be encouraged to use the method of loci, which relates to mentally associating the gaming passcode: That is, associating the specific icons the user has chosen and the specific locations the user has chosen to place those icons on the game board with external objects and locations that are meaningful to the user.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. An authentication method comprising:
presenting a menu of a plurality of game boards to a user on a touch screen device;
selecting, by the user, one of said game boards from said plurality of gameboards, as a first passcode component;
displaying the one said game board and at least one icon relative to said game board on said touch screen device;
selecting on said touch screen device, by the user, said at least one icon as a second passcode component;
placing on said touch screen device, by the user, said at least one icon selected at a predetermined location on said game board as a third passcode component, wherein said predetermined location is visually identifiable on said touch screen device;
generating an entered passcode from each of said first, second and third passcode components;
determining whether said entered passcode is authenticated based on a comparison with a previously set rule; and
changing said game board after said determining step is performed.

2. The authentication method of claim 1, wherein said plurality of game boards includes one or more of chess, Chinese chess, card games, and roulette.

3. The authentication method of claim 1, wherein said placing step is performed by the user controlling said one or more icons with an input device.

4. The authentication method of claim 3, wherein said input device is selected from the group consisting of: a touch screen interface, a keyboard, a direction pointer device, a stylus, a directional control pad, a camera, a motion tracking device, or a voice recognition device.

5. The authentication method of claim 1, wherein if said rule comprises said entered passcode, said entered passcode is authenticated.

6. The authentication method of claim 1, wherein said moving step is performed by controlling said user-controlled icon by an input device.

7. The authentication method of claim 6, wherein said input device is selected from the group consisting of: a touch screen interface, a keyboard, a direction pointer device, a stylus, a directional control pad, a camera, a motion tracking device, or a voice recognition device.

8. An authentication method comprising:
- displaying a game board and at least one user-controlled icon relative to said game board and at least one computer-controlled icon relative to said game board on a touch screen device, wherein said game board includes a plurality of locations to which said user-controlled icon is permitted to be moved that are visually identifiable;
- initiating a game between said user and said computer utilizing said at least one user-controlled icon and said at least one computer-controlled icon;
- moving said at least one user-controlled icon in response to a move undertaken by said at least one computer-controlled icon initiated by said computer on said game board on said touch screen device to generate an entered passcode;
- determining whether said entered passcode is authenticated based on a comparison with a previously set rule; and
- changing said game board and said game after said determining step is performed.

9. The authentication method of claim 8, wherein said game board is based on a chess game, a Chinese chess game, a card game, or a roulette game.

10. The authentication method of claim 8, wherein said game is associated with said game board.

11. The authentication method of claim 8, wherein if said rule comprises said entered passcode, said entered passcode is authenticated.

12. The authentication method of claim 8, further comprising:
- identifying a positional sequence of movements of said user-controlled icon performed at said moving step, said sequence comprising said entered passcode.

13. The authentication method of claim 8, further comprising:
- identifying a game playing style of said user-controlled icon based on one or more movements of said icon at said moving step.

* * * * *